(12) United States Patent
Autenzeller

(10) Patent No.: US 10,969,549 B2
(45) Date of Patent: Apr. 6, 2021

(54) DEVICE FOR TRANSMITTING OPTICAL SIGNALS BETWEEN TWO ROTATABLE SUBASSEMBLIES

(71) Applicant: LTN Servotechnik GmbH, Otterfing (DE)

(72) Inventor: Peter Autenzeller, Feldkirchen-Westerham (DE)

(73) Assignee: LTN SERVOTECHNIK GMBH, Otterfing (DE)

( * ) Notice: Subject to any disclaimer, the term of this patent is extended or adjusted under 35 U.S.C. 154(b) by 0 days.

(21) Appl. No.: 16/592,306

(22) Filed: Oct. 3, 2019

(65) Prior Publication Data

US 2020/0110222 A1    Apr. 9, 2020

(30) Foreign Application Priority Data

Oct. 4, 2018 (EP) .................................... 18198638

(51) Int. Cl.
*G02B 6/36* (2006.01)
(52) U.S. Cl.
CPC .................. *G02B 6/3604* (2013.01)
(58) Field of Classification Search
CPC .................................................. G02B 6/3604
USPC .......................................................... 385/26
See application file for complete search history.

(56) References Cited

U.S. PATENT DOCUMENTS

| | | | |
|---|---|---|---|
| 4,124,727 A | 11/1978 | Rockland et al. | |
| 4,815,812 A * | 3/1989 | Miller | G02B 6/32 385/25 |
| 5,633,963 A | 5/1997 | Rickenbach et al. | |
| 10,054,159 B2 * | 8/2018 | Reichert | F16C 19/364 |
| 2002/0106163 A1 * | 8/2002 | Cairns | G02B 6/3821 385/60 |
| 2003/0147602 A1 * | 8/2003 | Takada | G02B 6/4292 385/93 |
| 2014/0350414 A1 | 11/2014 | McGowan et al. | |

FOREIGN PATENT DOCUMENTS

FR          2487989 A1     2/1982

* cited by examiner

*Primary Examiner* — Jerry M Blevins
(74) *Attorney, Agent, or Firm* — Carter DeLuca & Farrell LLP

(57) ABSTRACT

In a device for transmitting optical signals between a first subassembly and a second subassembly, which rotatable about an axis relative to the first subassembly. The first subassembly includes a first optical waveguide, and the second subassembly includes a second optical waveguide. The device includes a first sleeve enclosing the first optical waveguide, a first bushing enclosing the first sleeve, a housing, a second sleeve enclosing the second optical waveguide, a second bushing enclosing the second sleeve. Furthermore, the device includes a bearing arrangement, including at least one first ring and rolling elements, rollingly supported on a conical surface. The housing encloses the first bushing, the second bushing, and the bearing arrangement, the bearing arrangement is axially displaceable relative to the housing, and the second bushing is axially preloaded with respect to the first bushing via the bearing arrangement. The rolling elements are radially preloaded with respect to the housing by their support on the conical surface.

18 Claims, 2 Drawing Sheets

DEVICE FOR TRANSMITTING OPTICAL SIGNALS BETWEEN TWO ROTATABLE SUBASSEMBLIES

CROSS-REFERENCE TO RELATED APPLICATIONS

The present application claims priority to application Ser. No. 18/198,638.1, filed in the European Patent Office on Oct. 4, 2018, which is expressly incorporated herein in its entirety by reference thereto.

FIELD OF THE INVENTION

The present invention relates to a device for transmitting optical signals between two subassemblies, which are, for example, rotatable relative to each other.

BACKGROUND INFORMATION

Subassemblies of this type are often also referred to as rotors and stators. In these subassemblies, optical signals are routed via optical waveguides, which are frequently separated by an air gap and axially situated at an offset from one another. Such devices are used in many technical fields for the purpose of transmitting signals from a stationary to a rotating unit.

U.S. Pat. No. 5,633,963 describes an optical rotary joint in which signals are transmitted between two coaxial optical waveguides.

SUMMARY

Example embodiments of the present invention provide a device for the transmission of optical signals, which allows for very high transmission rates and yet is able to be produced in a relatively uncomplicated manner.

According to an example embodiment of the present invention, the device is suitable for transmitting optical signals between a first subassembly and a second subassembly, the second subassembly being rotatable about an axis relative to the first subassembly. The first subassembly has a first optical waveguide and the second subassembly has a second optical waveguide. In addition, the device includes a first sleeve, a first bushing, and a housing, the first sleeve enclosing the first optical waveguide, and the first bushing enclosing the first sleeve. Moreover, the device includes a second sleeve and a second bushing, the second sleeve enclosing the second optical waveguide. The second bushing additionally encloses the second sleeve. The device also includes a bearing arrangement, which includes at least one first ring as well as rolling elements, e.g., balls, the rolling elements being supported on a conical surface in a manner that allows them to roll. In addition, the device is configured so that the housing at least partially encloses the first bushing, at least partially encloses the second bushing, and also at least partially encloses the bearing arrangement. The bearing arrangement is placed so as to be axially displaceable relative to the housing. The second bushing is axially preloaded with respect to the first bushing by a second spring element via the bearing arrangement, and the rolling elements are radially preloaded with respect to the housing through their support on the conical surface.

The first sleeve encloses the first optical waveguide in particular in only one section of the optical waveguide, usually at the end or in an end region of the optical waveguide. The same also applies to the second sleeve and the second optical waveguide. The two optical waveguides are situated coaxially opposite each other in the device. The device in particular has no lens or collimator.

Regarding the first bushing being preloaded via the bearing arrangement, it should be understood that a force introduced by the second spring element may be applied beyond the bearing arrangement into the first bushing. The flow of force thus takes place from the second spring element across the bearing arrangement to the first bushing.

Regarding the housing at least partially enclosing the first bushing, at least partially enclosing the second bushing, and also at least partially enclosing the bearing arrangement, it should be understood that the housing may enclose these components fully or only partially in the axial direction, or that only axial sections of these components may be enclosed by the housing.

The device is configured such that the optical path of the light routed through the optical waveguides propagates with an axial directional component. The optical waveguides may be arranged as a multi-mode fiber or a mono-mode fiber, for example.

The second bushing may enclose both the first sleeve and the second sleeve. The second bushing may be provided in two parts, in particular, and may include a first partial bushing and a second partial bushing. In addition, the second partial bushing may then enclose both the first sleeve and the second sleeve. The first partial bushing may, for example, enclose only the second sleeve in this case. In addition, the second partial bushing may have a smaller outer diameter than the first partial bushing.

The rolling elements may furthermore support themselves on a surface of the housing which is situated radially on the inside and they may be adapted to roll on this surface. In this context, it should be taken into account that the housing need not necessarily be arranged in one piece, but that an additional component, which forms a rolling surface for the rolling elements, for example, may be installed in the housing.

The first sleeve, the first bushing, the second sleeve, the second bushing, the first partial bushing, and/or the second partial bushing may be produced from a ceramic material, in particular from aluminum oxide or zirconium oxide.

The device may be configured such that an air gap is present axially between the first optical waveguide and the second optical waveguide. More specifically, the device may be configured such that no lens and no collimator are provided between the first optical waveguide and the second optical waveguide.

The first sleeve, the first bushing, and the housing may be allocated to, or associated with, the first subassembly and, for example, may be situated in a torsionally fixed manner relative to one another.

The first bushing may be axially preloaded with respect to the housing, in particular with respect to an inwardly projecting edge or a step of the housing, by a first spring element.

The first spring element may be allocated to, or associated with, the first subassembly and, for example, may be situated in a torsionally fixed manner relative to the first optical waveguide.

The second spring element may be allocated to, or associated with, the first subassembly.

The second sleeve and the second bushing may be allocated to, or associated with, the second subassembly.

The bearing arrangement may include a second ring, which also has a conical surface, and the rolling elements may be arranged to support themselves and to roll on the conical surface of the second ring.

The first ring and/or the second ring may have a conical surface in each case. However, the device may also be configured so that the second spring element presses an element having a planar end face, e.g., a hollow-cylindrical body, against the rolling elements, in which case a conical surface is located on the subassembly situated opposite the second spring element, so that the rolling elements are pushed radially toward the outside, or in other words, are preloaded with respect to the housing.

The conical surfaces may have the form of a right cone or a right truncated cone in each case. The axis of symmetry of the conical surfaces or cones is the axis about which the first subassembly is rotatable relative to the second subassembly.

The second bushing, for example, the second partial bushing, may include grooves and webs on the inside so that the grooves are able to hold lubricant or may be used as a storage volume for lubricants, for example. The grooves and webs may extend along a direction having an axial directional component. For example, the grooves and webs may extend precisely in the axial direction or may extend in the form of waves or helixes. Alternatively, the inner surface the second bushing may also be smooth.

The particular construction of the device, for example, includes a bearing arrangement that may be referred to as a quasi-self-adjusting rolling bearing. The device makes it possible to transmit signals of an outstanding quality with low attenuation, which means that extremely high data or transmission rates are achievable.

Further features and aspects of example embodiments of the present invention are described in more detail below with reference to the appended Figures

DETAILED DESCRIPTION

Figure 1:
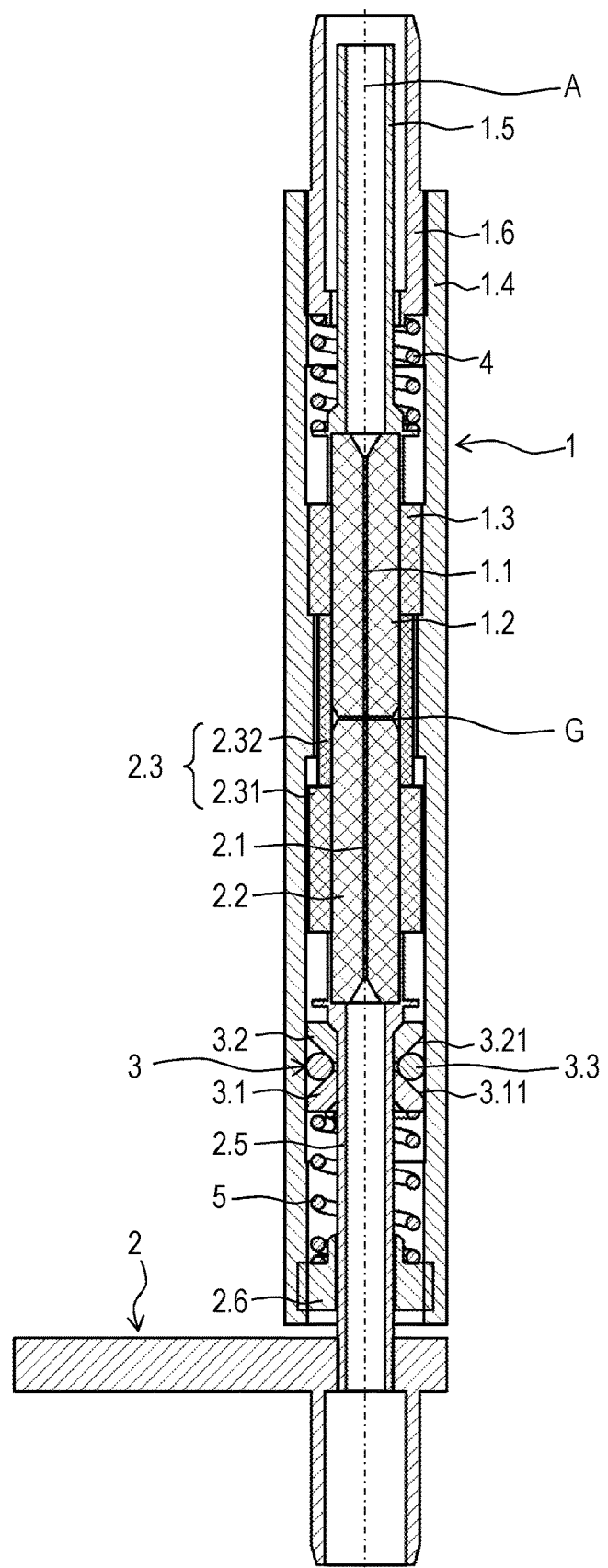
FIG. 1 is a longitudinal cross-sectional view of a device for the transmission of optical signals.

According to FIG. 1, the device according to an example embodiment of the present invention includes a first subassembly 1, e.g., a stator, and a second subassembly 2, e.g., a rotor. The device is used for the transmission of optical signals at a high transmission rate between first subassembly 1 and second subassembly 2, first subassembly 1 and subassembly unit 2 being situated so as to be rotatable relative to each other about an axis A.

First subassembly 1 includes a first optical waveguide 1.1, which is situated in the device in a centered manner relative to axis A. In one section at the end of first optical waveguide 1.1, it is enclosed by a first sleeve 1.2. In the illustrated exemplary embodiment, first sleeve 1.2 is made of a ceramic material, such as aluminum oxide or zirconium oxide. Moreover, optical waveguides 1.1, 2.1 are arranged as mono-mode fibers in this example embodiment.

In addition, first subassembly 1 includes a first plug housing 1.5, which also encloses first optical waveguide 1.1. Moreover, first subassembly 1 includes a housing 1.4, which is tubular in the illustrated exemplary embodiment. Internal threads are included in this housing 1.4 at both ends. A first preloading element 1.6 provided with an external thread is screwed into one of these inner threads. A first spring element 4, which is a coil spring in this example and which is axially preloaded in the installed state, is situated between first preloading element 1.6 and a collar of first plug housing 1.5.

Moreover, first subassembly 1 includes a first bushing 1.3, which is likewise produced from a ceramic material, such as aluminum oxide or zirconium oxide. This first bushing 1.3 encloses first sleeve 1.2 along a section of first sleeve 1.2.

Because of the axial preloading of first spring element 4, first plug housing 1.5 is pressed against first bushing 1.3, bushing 1.3 being axially supported on a step of housing 1.4. First bushing 1.3 is situated or held in place in a torsionally fixed manner relative to housing 1.4, in this example by being axially pressed against an inwardly directed step of housing 1.4.

Second subassembly 2 has a central second optical waveguide 2.1. The end of second optical waveguide 2.1 is enclosed by a second sleeve 2.2. This second sleeve 2.2 is in turn enclosed by a second bushing 2.3. In the illustrated exemplary embodiment, second bushing 2.3 includes two parts and accordingly includes a first partial bushing 2.31 and a second partial bushing 2.32. Second partial bushing 2.32 encloses both first sleeve 1.2 and second sleeve 2.2 and furthermore has a smaller outer diameter than first partial bushing 2.31. Second bushing 2.3, or both partial bushings 2.31, 2.32, are produced from a ceramic material, e.g., from aluminum oxide or zirconium oxide.

Figure 2:
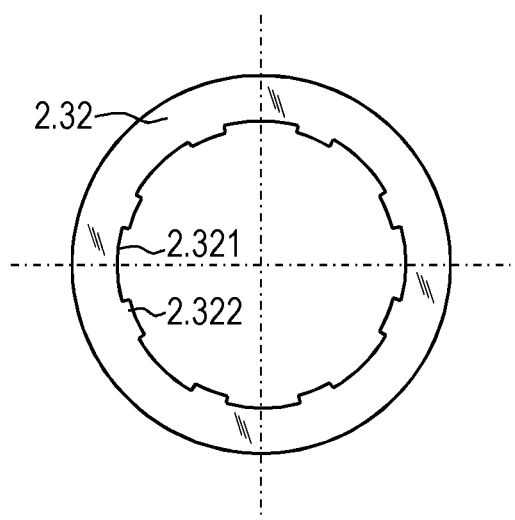
FIG. 2 is a side view of a bushing of the device.

As illustrated in FIG. 2, second partial bushing 2.32 includes grooves 2.321 and webs 2.322, which extend in the axial direction, for example.

In addition, second subassembly 2 has a second plug housing 2.5, which likewise encloses second optical waveguide 2.1. Finally, a second preloading element 2.6 may also be allocated to, or associated with, second subassembly 2.

A bearing arrangement 3 is used to mount second subassembly 2 relative to first subassembly 1. Bearing arrangement 3 includes a first conical ring 3.1, a second conical ring 3.2, and rolling elements 3.3, which are arranged in the form of balls, for example. Rolling elements 3.3 are situated axially between first conical ring 3.1 and second conical ring 3.2. Both first conical ring 3.1 and second conical ring 3.2 have a conical surface 3.11 and 3.21 respectively. Rolling elements 3.3 are supported on these conical surfaces 3.11, 3.21 and roll on these conical surfaces 3.11, 3.21 when the device is in operation. First conical ring 3.1 and second conical ring 3.2 surround second plug housing 2.5, and second conical ring 3.2 is able to be brought axially to a stop against a beveled step of second plug housing 2.5. Bearing arrangement 3 is situated so as to be axially displaceable both relative to housing 1.4 and second plug housing 2.5. In the illustrated exemplary embodiment, a relative rotatability of first conical ring 3.1 and second conical ring 3.2 relative to housing 1.4 is provided in addition.

Situated between preloading element 2.6 and first conical ring 3.1 is a second spring element 5, which has the form of a coil spring in this case. Preloading element 2.6 has an external thread, which is able to be screwed into the inner thread of housing 1.4 in order to adjust the preloading of second spring element 5. Second spring element 5 thus exerts pressure against first conical ring 3.1. Since first conical ring 3.1 is mounted so as to be axially displaceable relative to second plug housing 2.5, rolling elements 3.3 are radially pushed in the outward direction, which ensures that they make contact with the inner wall of housing 1.4. Rolling elements 3.3 thus support themselves on a surface of housing 1.4 situated radially on the inside and roll on the inner surface of housing 1.4 while the device is operating. As a result, rolling elements 3.3 are radially preloaded with respect to housing 1.4 by the support on conical surface 3.11. In the final analysis, second optical waveguide 2.1 is precisely centered relative to housing 1.4 in such a manner.

In addition, the axial preloading force generated by second spring element 5 is transmitted to second plug housing 2.5 via second conical ring 3.2. As a result, second bushing 2.3 is axially preloaded with respect to first bushing 1.3 by second spring element 5, the flow of force taking place via bearing arrangement 3.

The axial preloading force is thus transmitted via second bushing 2.3 (especially via first partial bushing 2.31 and second partial bushing 2.32) to first bushing 1.3. In contrast to first bushing 1.3, second bushing 2.3 is situated so as to be rotatable and axially displaceable relative to housing 1.4. In the illustrated exemplary embodiment, first partial bushing 2.31 and second partial bushing 2.32 are arranged such that (in particular their outer diameters) they are rotatable and displaceable relative to housing 1.4.

Thus, the end face of second bushing 2.3, in particular of second partial bushing 2.32, rotates relative to the end face of first bushing 1.3. Since both first bushing 1.3 and second bushing 2.3 are produced from ceramic materials and have a relatively smooth surface, the resulting friction torques are low.

Because the axial length of second bushing 2.3 is precisely specified, the axial extension of air gap G, which amounts to 0.1 mm, for example, is able to be precisely adjusted. First partial bushing 2.31 in the illustrated exemplary embodiment is ground to an exact axial length for this purpose. In addition, grooves 2.321 are filled with lubricant so that a low-friction relative rotatability between first sleeve 1.2 and second partial bushing 2.32 is able to be achieved because first partial bushing 2.31 usually does not rotate relative to second partial bushing 2.32. However, it may happen for any number of reasons, in particular after a longer operation of the device, that first partial bushing 2.31 or second partial bushing 2.32 is only sluggishly rotatable relative to housing 1.4. In such a case, in particular, the bipartite configuration of second bushing 2.3 in the form of a first partial bushing 2.31 and a second partial bushing 2.32 offers the advantage that the relative rotation is shifted from the contact surface between first bushing 1.3 and second partial bushing 2.32 to the contact surface between second partial bushing 2.32 and first partial bushing 2.31. In this case as well, this ensures a relatively low-friction operation of the device because the friction torque or braking torque is relatively small here too as a result of the used ceramic materials and the relatively smooth end faces.

The device for transmitting optical signals thus has a first optical waveguide 1.1 and a second optical waveguide 2.1, which are situated opposite each other and are separated by an axial gap G. Because of the preloaded bearing arrangement 3 in conjunction with conical surfaces 3.11, 3.21, a precise concentric placement of first optical waveguide 1.1 relative to second optical waveguide 2.1 is provided in an uncomplicated manner. This aspect particularly applies to each relative angular position and also to a broad temperature range during the operation of the device. In addition, due to the construction described herein, the device is insensitive to externally introduced tilting moments, e.g., via the optical waveguides. The device is also characterized by a relatively small outer diameter.

As a result, a device is provided, which is suitable for the transmission of optical signals between two subassembly 1, 2 at extremely high transmission rates.

What is claimed is:

1. A device for transmitting optical signals, comprising:
a first subassembly including a first optical waveguide;
a second subassembly including a second optical waveguide, the first subassembly and the second subassembly being rotatable relative to each other about an axis;
a first sleeve enclosing the first optical waveguide;
a first bushing enclosing the first sleeve;
a second sleeve enclosing the second optical waveguide;
a second bushing enclosing the second sleeve;
a bearing arrangement including at least one first ring and rolling elements rollingly supported on a conical surface; and
a housing at least partially enclosing the first bushing, the second bushing, the bearing arrangement;
wherein the bearing arrangement is axially displaceable relative to the housing and the second bushing is axially preloaded with respect to the first bushing by a spring element via the bearing arrangement; and
wherein the rolling elements are radially preloaded with respect to the housing by the support of the rolling elements on the conical surface.

2. The device according to claim 1, wherein the second bushing encloses the first sleeve and the second sleeve.

3. The device according to claim 1, wherein the second bushing is arranged as a two-part bushing and includes a first partial bushing and a second partial bushing.

4. The device according to claim 3, wherein the second partial bushing encloses the first sleeve and the second sleeve.

5. The device according to claim 3, wherein the second partial bushing has a smaller outer diameter than the first partial bushing.

6. The device according to claim 3, wherein an inside of the second partial bushing includes grooves and webs.

7. The device according to claim 1, wherein the rolling elements are rollingly supported on a surface of the housing located radially inside.

8. The device according to claim 1, herein the first sleeve, the first bushing, the second sleeve, and/or the second bushing is made from a ceramic material.

9. The device according to claim 8, wherein the ceramic material includes aluminum oxide and/or zirconium oxide.

10. The device according to claim 1, wherein an air gap is located axially between the first optical waveguide and the second optical waveguide.

11. The device according to claim 1, wherein the first sleeve, the first bushing, and the housing are associated with the first subassembly.

12. The device according to claim 1, wherein the first bushing is axially preloaded with respect to the housing by a further spring element.

13. The device according to claim 12, wherein the further spring element is associated with the first subassembly.

14. The device according to claim 1, wherein the spring element is associated with the first subassembly.

15. The device according to claim 1, wherein the second sleeve and the second bushing are associated with the second subassembly.

16. The device according to claim 1, wherein the bearing arrangement includes a second ring having a conical surface, the rolling elements being rollingly supported on the conical surface of the second ring.

17. The device according to claim 1, wherein an inside of the second bushing includes grooves and webs.

18. A device for transmitting optical signals between a first subassembly, including a first optical waveguide, and a second subassembly, including a second optical waveguide, the first and the second subassembly being rotatable relative to each other about an axis, comprising:
- a first sleeve enclosing the first optical waveguide;
- a first bushing enclosing the first sleeve;
- a second sleeve enclosing the second optical waveguide;
- a second bushing enclosing the second sleeve;
- a bearing arrangement including at least one first ring and rolling elements rollingly supported on a conical surface; and
- a housing at least partially enclosing the first bushing, the second bushing, the bearing arrangement;
- wherein the bearing arrangement is axially displaceable relative to the housing and the second bushing is axially preloaded with respect to the first bushing by a spring element via the bearing arrangement; and
- wherein the rolling elements are radially preloaded with respect to the housing by the support of the rolling elements on the conical surface.

* * * * *